United States Patent
Koseki et al.

(10) Patent No.: US 10,994,769 B2
(45) Date of Patent: May 4, 2021

(54) ELECTRONIC CONTROL UNIT AND DIAGNOSTIC METHOD THEREFOR

(71) Applicant: HITACHI AUTOMOTIVE SYSTEMS, LTD., Hitachinaka (JP)

(72) Inventors: Tomonobu Koseki, Hitachinaka (JP); Yawara Kato, Hitachinaka (JP); Mamoru Ogura, Hitachinaka (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 0 days.

(21) Appl. No.: 16/980,566

(22) PCT Filed: Mar. 13, 2019

(86) PCT No.: PCT/JP2019/010205
§ 371 (c)(1),
(2) Date: Sep. 14, 2020

(87) PCT Pub. No.: WO2019/198407
PCT Pub. Date: Oct. 17, 2019

(65) Prior Publication Data
US 2021/0046973 A1  Feb. 18, 2021

(30) Foreign Application Priority Data
Apr. 12, 2018  (JP) .................. 2018-076698

(51) Int. Cl.
*H02P 6/12* (2006.01)
*B62D 5/04* (2006.01)
(Continued)

(52) U.S. Cl.
CPC ......... *B62D 5/0481* (2013.01); *B62D 15/025* (2013.01); *H02P 25/22* (2013.01); *H02P 27/06* (2013.01); *H02P 29/028* (2013.01)

(58) Field of Classification Search
CPC ..... B62D 5/0481; B62D 15/025; H02P 25/22; H02P 27/06; H02P 29/028
See application file for complete search history.

(56) References Cited

U.S. PATENT DOCUMENTS

2003/0071466 A1* 4/2003 Gale .................. B60L 50/51
290/40 C
2009/0033258 A1  2/2009 Atarashi
(Continued)

FOREIGN PATENT DOCUMENTS

JP   H08-168292 A   6/1996
JP   2009-038934 A   2/2009
(Continued)

OTHER PUBLICATIONS

International Search Report issued in corresponding International Application. No. PCT/JP2019/010205 dated Jun. 18, 2019 with English translation.
(Continued)

Primary Examiner — Muhammad S Islam
(74) Attorney, Agent, or Firm — Foley & Lardner LLP

(57) ABSTRACT

The electronic control unit includes first and second power connectors, first and second ground connectors, first and second inverters, first and second control circuits, and first and second current-voltage conversion elements. Each current-voltage conversion element is provided between a ground of the corresponding first or second inverter and a common ground of the first and second control circuits, and measures a ground current of the corresponding first or second control circuit. Then, each control circuit determines that the corresponding first or second ground connector is in an abnormal state based on a current flowing through the corresponding first or second current-voltage conversion element.

20 Claims, 7 Drawing Sheets

(51) Int. Cl.
*H02P 25/22* (2006.01)
*H02P 27/06* (2006.01)
*H02P 29/028* (2016.01)
*B62D 15/02* (2006.01)

(56) References Cited

U.S. PATENT DOCUMENTS

2017/0019052 A1* 1/2017 Suzuki .................. B62D 5/046
2017/0272009 A1   9/2017 Kawamura

FOREIGN PATENT DOCUMENTS

| JP | 2014-176215 A | 9/2014 |
| JP | 2016-032977 A | 3/2016 |
| JP | 2017-169405 A | 9/2017 |

OTHER PUBLICATIONS

Written Opinion issued in corresponding International Application. No. PCT/JP2019/010205 dated Jun. 18, 2019 with English translation.

* cited by examiner

ELECTRONIC CONTROL UNIT AND DIAGNOSTIC METHOD THEREFOR

TECHNICAL FIELD

The present invention relates to electronic control units with redundant configurations, and to diagnostic methods therefor.

BACKGROUND ART

Greater safety and reliability are required for electronic control units for vehicles, and thus, electronic control units are configured to have redundant systems in order to ensure continuation of control even in event of a failure. For example, in an electric power steering (EPS) system, there has been a problem of a sudden loss of assistance, which might arise due to, for example, an increase in size of vehicles, and employment of lane keep assistance. For example, in Patent Document 1, two motor drive circuits are provided, and an electric motor having two sets of multiphase motor coils is controlled by the two drive circuits. Thus, even if one circuit fails, the other circuit drives the electric motor, so that assistance of the steering force continues.

Furthermore, in order to cope with automated driving that will be implemented in the future, higher level safety measures are required, and there is a demand for dual power supplies to the EPS system. For example, in Patent Document 2, electric power is supplied from two power sources to first and second inverters through power supply lines of two systems, and each inverter drives the corresponding one of first and second coil sets of an electric motor.

REFERENCE DOCUMENT LIST

Patent Documents

Patent Document 1: JP 2014-176215 A
Patent Document 2: JP 2016-32977 A

SUMMARY OF THE INVENTION

Problem to be Solved by the Invention

When power is supplied from two power supplies to motor drive circuits of two systems and control circuits of two systems through power supply lines of two systems, a current capacity of each power connector and harness may be half compared to a case in which only one system is provided, in terms of cost and size. However, when the control circuits share a common ground, and if one of ground connectors has an open failure, the current capacity of the other ground system might be exceeded. That is, there is concern that currents from the drive circuits of two systems gather at a ground connector and a ground harness of the normal system, resulting in overheating of contacts, which may cause a so-called concurrent failure. If the drive circuits of two systems thereby fail to energize at the same time, "sudden loss of assistance" will occur.

Thus, in view of these circumstances, an object of the present invention is to provide an electronic control unit, and a diagnostic method therefor, having a system in which the power supply system, the drive system, and the control system are made redundant, and a common ground of the control system is provided, and being capable of continuing drive control of an electric motor by a normal system even when a ground connector or a ground harness is in an abnormal state.

Means for Solving the Problem

According to one aspect of the present invention, an electronic control unit includes:

a first power connector and a first ground connector;
a second power connector and a second ground connector;
a first inverter connected to the first power connector and the first ground connector, the first inverter energizing a first coil set of an electric motor to drive the first coil set;
a second inverter connected to the second power connector and the second ground connector, the second inverter energizing a second coil set of the electric motor to drive the second coil set;
first and second control circuits driven by the first and second internal power supply voltages generated from an external power supply voltage applied to the first power connector and the first ground connector, and the second power connector and the second ground connector, to control the first and second inverters, respectively;
a first current-voltage conversion element for determining whether the first ground connector is in an abnormal state, the first current-voltage conversion element being provided between a ground of the first inverter and a common ground of the first and second control circuits; and
a second current-voltage conversion element for determining whether the second ground connector is in an abnormal state, the second current-voltage conversion element being provided between a ground of the second inverter and the common ground of the first and second control circuits.

Furthermore, according to one aspect of the present invention, a diagnostic method for an electronic control unit for diagnosing first and second ground connectors, the electronic control unit including:

a first power connector and a first ground connector;
a second power connector and a second ground connector;
a first inverter connected to the first power connector and the first ground connector, the first inverter energizing a first coil set of an electric motor to drive the first coil set;
a second inverter connected to the second power connector and the second ground connector, the second inverter energizing a second coil set of the electric motor to drive the second coil set;
first and second control circuits driven by the first and second internal power supply voltages generated from an external power supply voltage applied to the first power connector and the first ground connector, and the second power connector and the second ground connector, to control the first and second inverters, respectively;
a first current-voltage conversion element for determining whether the first ground connector is in an abnormal state, the first current-voltage conversion element being provided between a ground of the first inverter and a common ground of the first and second control circuits; and
a second current-voltage conversion element for determining whether the second ground connector is in an abnormal state, the second current-voltage conversion element being provided between a ground of the second inverter and the common ground of the first and second control circuits,
the method includes the steps of:
inputting an output voltage of the first current-voltage conversion element to the first control circuit, and inputting an output voltage of the second current-voltage conversion element to the second control circuit; and determining whether the first ground connector is in an abnormal state by the first control circuit, and determining whether the second ground connector is in an abnormal state by the second control circuit.

Effects of the Invention

According to the present invention, since the first or second control circuit determines whether the first or second ground connector is in an abnormal state based on a current flowing through the first or second current-voltage conversion element, it is possible to continue drive control of the electric motor by the normal system even when a ground connector or a ground harness has failed or is abnormal.

MODE FOR CARRYING OUT THE INVENTION

Hereinbelow, an embodiment of the present invention will be described with reference to the accompanying drawings.

Figure 1:
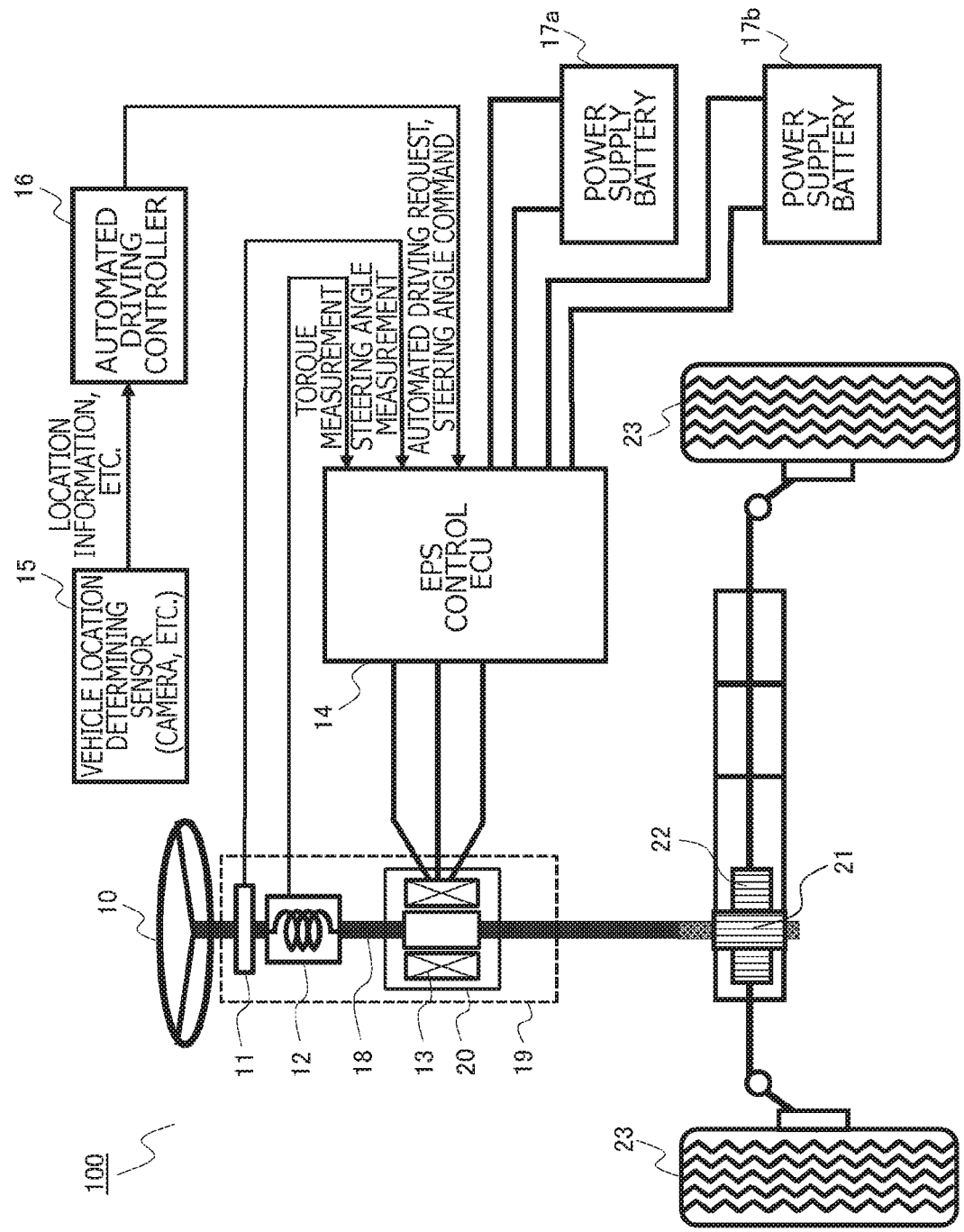
FIG. 1 is a schematic configuration view of an electric power steering system to which an electronic control unit according to the present invention is applied.

FIG. 1 shows a schematic configuration of an electric power steering (EPS) system 100 to which an electronic control unit according to the present invention is applied. EPS system 100 includes, for example, a steering wheel 10, a steering angle sensor 11, a steering torque sensor 12, an electric motor 13 for assisting a steering force, an EPS control ECU 14, a vehicle location determining sensor 15, an automated driving controller 16, and power supplies (batteries) 17a, 17b. Steering angle sensor 11, steering torque sensor 12, electric motor 13, and a speed reducer 20 are provided in a steering column 19 including a steering shaft 18.

In a case in which a driver of a vehicle performs a steering operation, steering torque sensor 12 measures a steering torque generated on steering shaft 18, and EPS control ECU 14 drives electric motor 13 based on, for example, this torque measurement and a vehicle speed signal, to generate a steering force depending on a traveling state of the vehicle to provide assistance. This makes a pinion gear 21 provided at a tip of steering shaft 18 rotate, and a rack shaft 22 horizontally moves to the left and right in a traveling direction, so that the steering operation is transmitted to wheels (steering wheels) 23, 23, to change the traveling direction of the vehicle.

In contrast, in a case of an automated driving, location information, or the like, is obtained by vehicle location determining sensor 15, such as a camera, and an automated driving request and a steering angle command are supplied from automated driving controller 16 to EPS control ECU 14 based on this location information, to perform steering operation. EPS control ECU 14 calculates a steering amount based on, for example, a steering angle measurement measured by steering angle sensor 11, a torque measurement of steering shaft 18 measured by steering torque sensor 12. By having EPS control ECU 14 drive electric motor 13, steering wheel 10 is operated via speed reducer 20 such that a steering angle approaches the steering angle instructed by automated driving controller 16.

Figure 2:
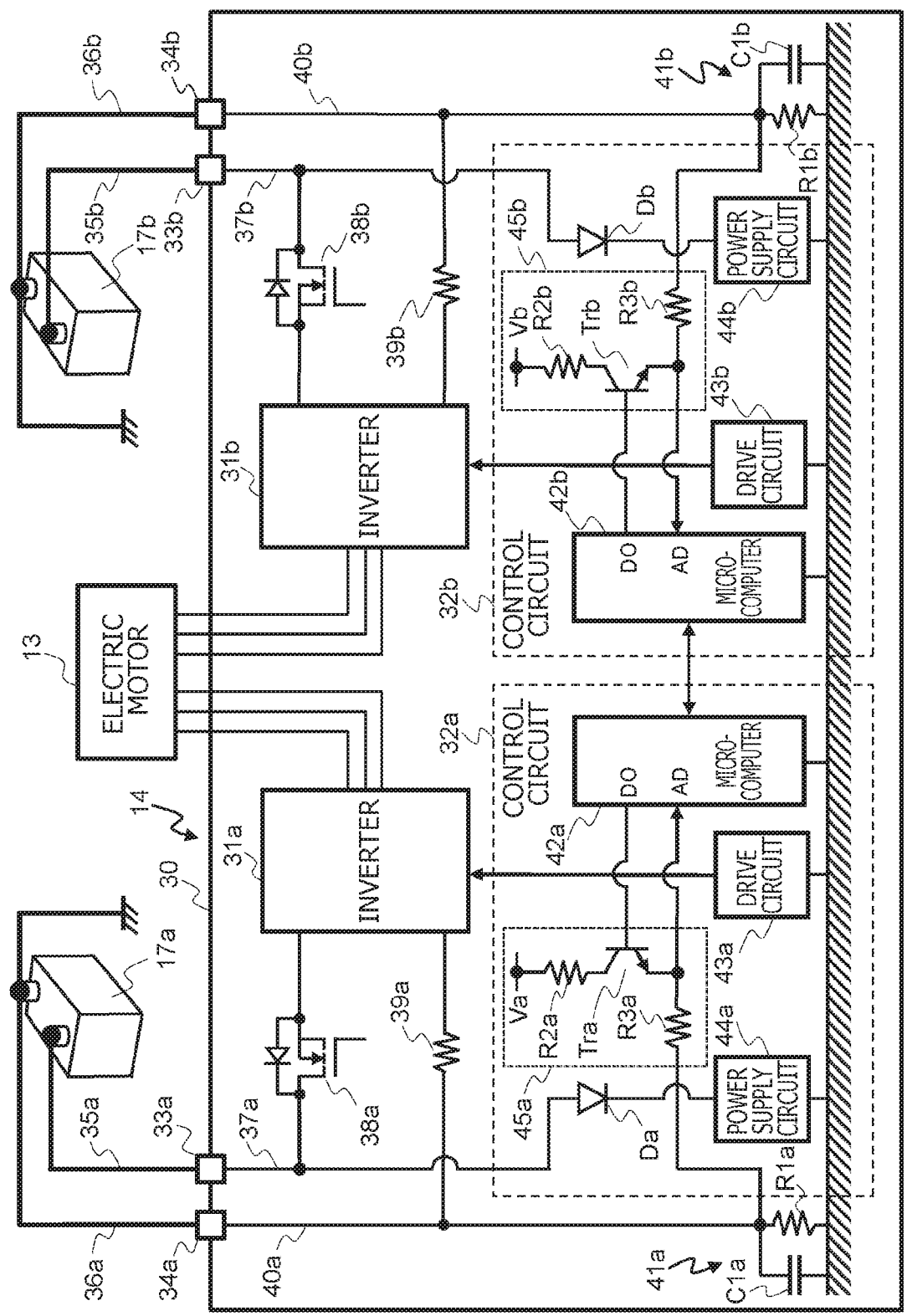
FIG. 2 is a circuit diagram of the electronic control unit according to an embodiment of the present invention.

FIG. 2 shows the electronic control unit according to the embodiment of the present invention. The electronic control unit corresponds to EPS control ECU 14 in EPS system 100 in FIG. 1. FIG. 2 shows the extracted main part involved in the power supply to EPS control ECU 14, and the assistance of steering force and the steering angle control performed by electric motor 13. A housing 30 of EPS control ECU 14 accommodates, for example, first and second inverters 31a, 31b, first and second control circuits 32a, 32b, and first and second current-voltage conversion elements 41a, 41b.

Housing 30 is provided with a first power connector 33a, a first ground connector (referred to as "first GND connector") 34a, a second power connector 33b, and a second ground connector (referred to as "second GND connector") 34b. First power connector 33a is supplied with electric power from first power supply 17a through a first power supply harness 35a, and first GND connector 34a is supplied with electric power from first power supply 17a through a first ground harness (referred to as "first GND harness") 36a. Second power connector 33b is supplied with electric power from second power supply 17b through a second power supply harness 35b, and second GND connector 34b is supplied with electric power from second power supply 17b through a second ground harness (referred to as "second GND harness") 36b.

To first power connector 33a, a power supply relay 38a is connected through a power supply line 37a, and a power input unit (on the positive electrode side) of first control circuit 32a is connected. Power supply relay 38a controls power supply and power shutoff of electric power from first power supply 17a to first inverter 31a, based on an output signal of first control circuit 32a. To a ground terminal (on the negative electrode side) of first inverter 31a, one end of a first shunt resistor 39a for measuring a phase current flowing through a first coil set in electric motor 13 is connected.

To first GND connector 34a, the other end of first shunt resistor 39a is connected through a GND line 40a. One end of first current-voltage conversion element 41a is connected to first shunt resistor 39a and first GND connector 34a through GND line 40a, and the other end thereof is connected to first control circuit 32a on the negative electrode side (i.e., a common ground shared with second control circuit 32b).

Similarly to first power connector 33a, to second power connector 33b, power supply relay 38b is connected through a power supply line 37b, and a power input unit of second control circuit 32b is connected. Power supply relay 38b controls power supply and power shutoff of electric power from second power supply 17b to second inverter 31b, based on an output signal of second control circuit 32b. To aground terminal of second inverter 31b, one end of a second shunt resistor 39b for measuring a phase current flowing through a second coil set in electric motor 13 is connected.

To second GND connector 34b, the other end of second shunt resistor 39b is connected through a GND line 40b. One end of second current-voltage conversion element 41b is connected to second shunt resistor 39b and second GND connector 34b through GND line 40b, and the other end thereof is connected to second control circuit 32b on the negative electrode side (i.e., the common ground shared with first control circuit 32a).

First control circuit 32a controls first inverter 31a, and is provided with, for example, a microcomputer 42a, a drive circuit 43a, a power supply circuit 44a, a current measuring circuit 45a, and a diode Da. Second control circuit 32b controls second inverter 31b, and is provided with, for example, a microcomputer 42b, a drive circuit 43b, a power supply circuit 44b, a current measuring circuit 45b, and a diode Db. Microcomputers 42a, 42b communicate with each other to share information on failures and abnormalities between the two systems. Drive circuit 43a is controlled by microcomputer 42a to supply a pulse width modulation (PWM) signal to the first coil set of electric motor 13 to control the first coil set. Drive circuit 43b is controlled by microcomputer 42b to supply a PWM signal to the second coil set of electric motor 13 to control the second coil set. Current measuring circuits 45a, 45b have a relatively simple configuration, in which a current (the amount or the direction of the current) is directly measured by using current-voltage conversion elements 41a, 41b without using an amplifier circuit or a buffer circuit.

A power supply voltage is applied to power supply circuit 44a from first power supply 17a via diode Da, and a first internal power supply voltage of, for example, 5 V is generated thereby, and is supplied to microcomputer 42a, drive circuit 43a, and current measuring circuit 45a. Current measuring circuit 45a includes an NPN transistor Tra, and resistors R2a, R3a. Resistor R2a is connected between a collector of NPN transistor Tra and an internal power supply Va, and a base is connected to a digital output terminal DO of microcomputer 42a. One end of resistor R3a is connected to an analog input terminal AD of microcomputer 42a and an emitter of NPN transistor Tra, and the other end is connected to one end of first current-voltage conversion element 41a. A current path from the one end of first current-voltage conversion element 41a to analog input terminal AD of microcomputer 42a via resistor R3a serves as a first transmission line configured to transmit a voltage of first current-voltage conversion element 41a to microcomputer 42a.

Current measuring circuit 45a has a function as a first potential setting unit that changes an electric potential of the first transmission line by the control of microcomputer 42a. That is, NPN transistor Tra is set to an OFF state in the normal state, and is set to an ON state during diagnosis, by the control of microcomputer 42a. For example, NPN transistor Tra is turned on at startup of the vehicle (EPS control ECU 14). When NPN transistor Tra is turned on, a current flows from internal power supply Va to the common ground via resistor R2a, NPN transistor Tra, resistor R3a, and resistor R1a. The voltage at one end of resistor R3a at this time is input to microcomputer 42a, and is converted into digital data. A voltage obtained by dividing the voltage of internal power supply Va by resistors R2a, R3a, R1a is used to determine whether a failure has occurred. Microcomputer 42a is configured to control NPN transistor Tra to change the level of a current measurement signal output from current-voltage conversion element 41a and input into analog input terminal AD. When microcomputer 42a changes the level of the current measurement signal, microcomputer 42a determines whether the level is within a predetermined range (intermediate electric potential). Then, when it is determined that the level is out of the range, microcomputer 42a reduces a sum of currents of the two systems supplied to inverters 31a, 31b.

On the other hand, a power supply voltage is applied to power supply circuit 44b from second power supply 17b via diode Db, and a second internal power supply voltage of, for example, 5 V is generated thereby, and is supplied to microcomputer 42b, drive circuit 43b, and current measuring circuit 45b. Current measuring circuit 45b includes an NPN transistor Trb, and resistors R2b, R3b. A resistor R2b is connected between a collector of NPN transistor Trb and an internal power supply Vb, and a base is connected to a digital output terminal DO of microcomputer 42b. One end of resistor R3b is connected to an analog input terminal AD of microcomputer 42b and an emitter of NPN transistor Trb, and the other end is connected to one end of second current-voltage conversion element 41b. A current path from the one end of second current-voltage conversion element 41b to analog input terminal AD of microcomputer 42b via resistor R3b serves as a second transmission line configured to transmit a voltage of second current-voltage conversion element 41b to microcomputer 42b.

Current measuring circuit 45b has a function as a second potential setting unit that sets an electric potential of the second transmission line by the control of microcomputer 42b. That is, NPN transistor Trb is set to an OFF state in the normal state, and is set to an ON state during diagnosis, by the control of microcomputer 42b. For example, NPN transistor Trb is turned on at startup of the vehicle (EPS control ECU 14). When NPN transistor Trb is turned on, a current flows from internal power supply Vb to the common ground via resistor R2b, NPN transistor Trb, resistor R3b, and resistor R1b. The voltage atone end of resistor R3b at this time is input to microcomputer 42b, and is converted into digital data. A voltage obtained by dividing the voltage of internal power supply Vb by resistors R2b, R3b, R1b is used to determine whether a failure has occurred. Microcomputer 42b is configured to control NPN transistor Trb to change the level of a current measurement signal output from current-voltage conversion element 41b and input into analog input terminal AD. When microcomputer 42b changes the level of the current measurement signal, microcomputer 42b determines whether the level is within a predetermined range (intermediate electric potential). Then, when it is determined that the level is out of the range, microcomputer 42b reduces a sum of currents of the two systems supplied to inverters 31a, 31b.

It is preferable that a potential difference between the grounds of inverters 31a, 31b, and the common ground of control circuits 32a, 32b be 0.3 V or less in the normal state. For example, assuming that the voltage of internal power supply Va is 5 V, the resistance of each current-voltage conversion element 41a, 41b (resistor R1a, R1b) is 0.1Ω, and the resistance of each resistor R2a, R3a is 10 kΩ, then the circuit current flowing through current-voltage conversion element 41a, 41b is 1 A, and a voltage of 0.1 V is generated. Therefore, a threshold for abnormality determination is greater than 0 V, and the threshold is set to 1 V for the resistance of 0.1Ω of current-voltage conversion element 41*a*, 41*b*, and thus, it is determined that there is an abnormality when a current of 10 A flows into the common ground of control circuit 32*a*, 32*b*.

In a case of a one-shunt type current measurement configuration, an input voltage to current measuring circuit 45*a*, 45*b* is 0.3 V or less. Since the breakdown voltage of current measuring circuit 45*a*, 45*b* (forward voltage of ESD protection diode) and the common mode input voltage is often 0.3 V or less, it is possible to reduce a malfunction or damage by setting the input voltage to 0.3 V or less. Furthermore, by providing resistors R1*a*, R1*b*, it is possible to compensate for an increased amount of the ground potential.

First current-voltage conversion element 41*a* is provided between first GND connector 34*a* and the common ground of first and second control circuits 32*a*, 32*b*, and it measures aground current. Second current-voltage conversion element 41*b* is provided between second GND connector 34*b* and the common ground of first and second control circuits 32*a*, 32*b*, and it measures a ground current. In this example, first current-voltage conversion element 41*a* is composed of resistor R1*a* and a capacitor C1*a* connected in parallel, and second current-voltage conversion element 41*b* is composed of resistor R1*b* and a capacitor C1*b* connected in parallel. Resistors R1*a*, R1*b* are used to convert a measured ground current into a voltage. Furthermore, capacitors C1*a*, C1*b* serve to reduce the occurrence of a transient potential difference between the grounds of inverters 31*a*, 31*b*, and the common ground of control circuits 32*a*, 32*b*, and may be provided as necessary.

Figure 3:
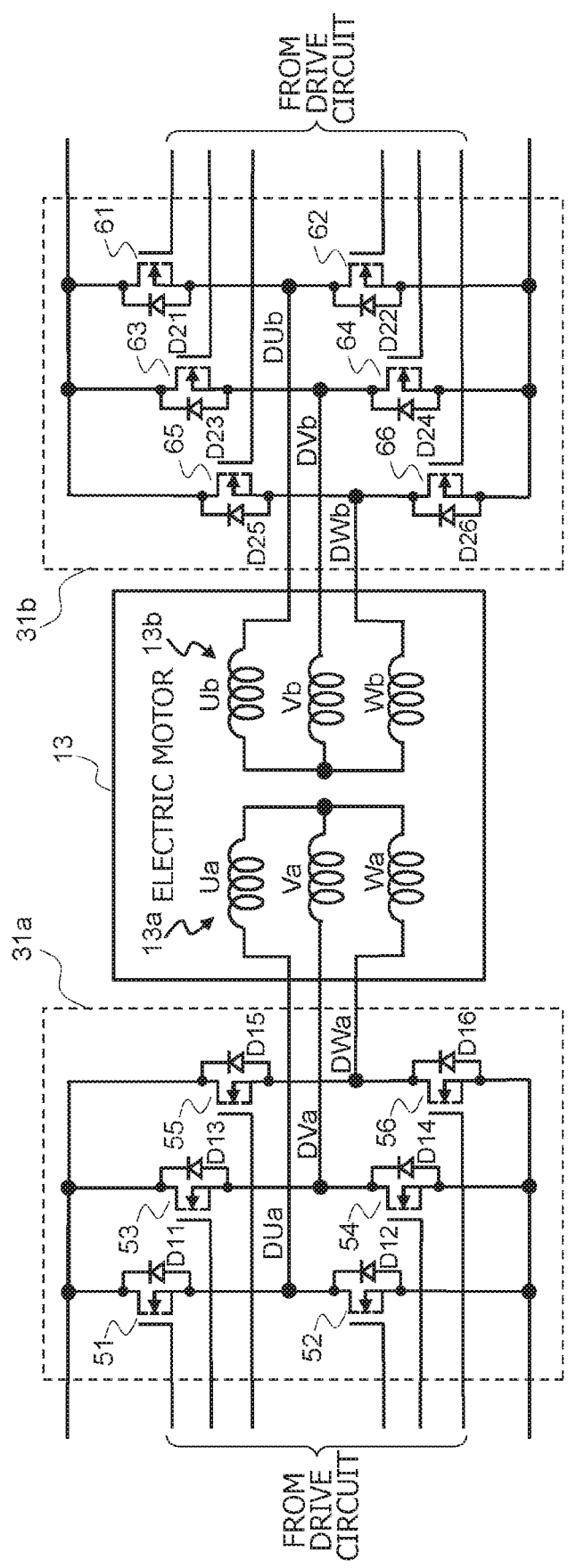
FIG. 3 is a circuit diagram showing an example of the configuration of first and second inverters and an electric motor in the electronic control unit shown in FIG. 2.

FIG. 3 shows an example of the configuration of first and second inverters 31*a*, 31*b*, and electric motor 13 in the electronic control unit shown in FIG. 2. As shown in FIG. 3, electric motor 13 that assists the steering force is a three-phase motor, and includes a U-phase coil Ua, a V-phase coil Va, and a W-phase coil Wa (first coil set 13*a*) for a first system, and a U-phase coil Ub, a V-phase coil Vb, and a W-phase coil Wb (second coil set 13*b*) for a second system. First coil set 13*a* is configured to be driven by first inverter 31*a*, and second coil set 13*b* is configured to be driven by second inverter 31*b*.

Each of first and second inverters 31*a*, 31*b* is configured to energize the corresponding coil set of electric motor 13 to drive the corresponding coil set. First inverter 31*a* has a three-phase bridge circuit configuration that includes three sets of switching elements that individually drive U-phase coil Ua, V-phase coil Va, and W-phase coil Wa of electric motor 13, via drive lines DUa, DVa, DWa. Furthermore, second inverter 31*b* has a three-phase bridge circuit configuration that includes three sets of switching elements that individually drive U-phase coil Ub, V-phase coil Vb, and W-phase coil Wb of electric motor 13, via drive lines DUb, DVb, DWb. In this example, each switching element of first inverter 31*a* is composed of N-channel MOSFETs 51 to 56, and each switching element of second inverter 31*b* is composed of N-channel MOSFETs 61 to 66.

MOSFETs 51, 52 of first inverter 31*a* are connected in series between one end of power supply relay 38*a* and one end of first shunt resistor 39*a* by the drains and the sources, and one end of drive line DUa is connected to a common connection point. MOSFETs 53, 54 are connected in series between the one end of power supply relay 38*a* and the one end of first shunt resistor 39*a* by the drains and the sources, and one end of drive line DVa is connected to a common connection point. MOSFETs 55, 56 are connected in series between the one end of power supply relay 38*a* and the one end of first shunt resistor 39*a* by the drains and the sources, and one end of drive line DWa is connected to a common connection point.

Here, diodes D11 to D16 connected in the forward direction between the source and drain of each of MOSFETs 51 to 56 are body diodes.

MOSFETs 61, 62 of second inverter 31*b* are connected in series between one end of power supply relay 38*b* and one end of second shunt resistor 39*b* by the drains and the sources, and one end of drive line DUb is connected to a common connection point. MOSFETs 63, 64 are connected in series between the one end of power supply relay 38*b* and the one end of second shunt resistor 39*b* by the drains and the sources, and one end of drive line DVb is connected to a common connection point. MOSFETs 65, 66 are connected in series between the one end of power supply relay 38*b* and the one end of second shunt resistor 39*b* by the drains and the sources, and one end of drive line DWb is connected to a common connection point.

Here, diodes D21 to D26 connected in the forward direction between the source and drain of each of MOSFETs 61 to 66 are body diodes.

In the above configuration, microcomputer 42*a* determines whether first GND connector 34*a* is in an abnormal state based on the energization direction of first current-voltage conversion element 41*a*, and microcomputers 42*b* determines whether second GND connector 34*b* is in an abnormal state based on the energization direction of second current-voltage conversion element 41*b*.

Figure 4:
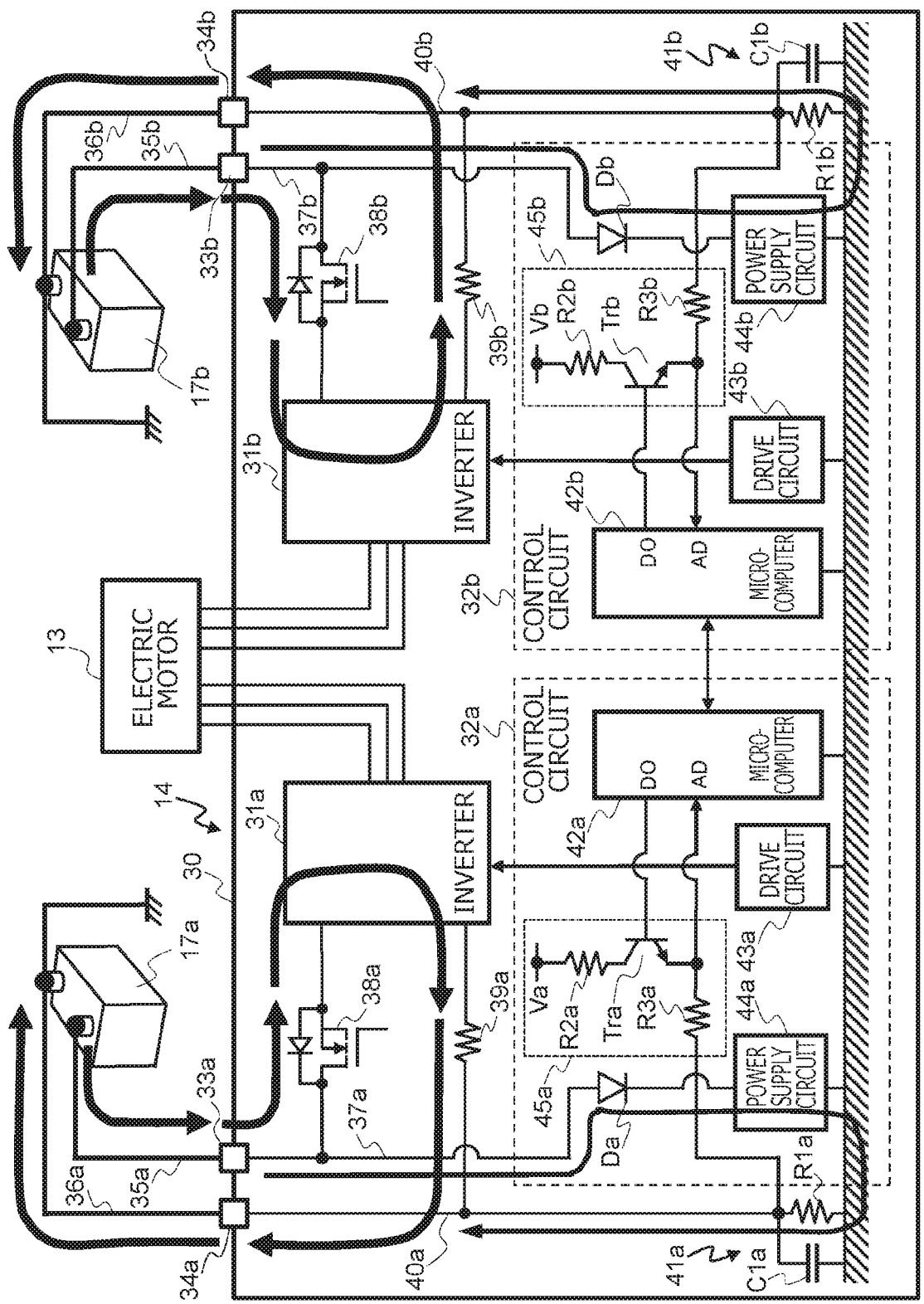
FIG. 4 is a circuit diagram showing flows of current from first and second power supplies, in a normal state, in the electronic control unit shown in FIG. 2.

In a normal state, as indicated by arrows in FIG. 4, a large current flows from the positive electrode of first power supply 17*a* to the negative electrode of first power supply 17*a* through first power supply harness 35*a*, first power connector 33*a*, power supply line 37*a*, power supply relay 38*a*, first inverter 31*a*, first shunt resistor 39*a*, GND line 40*a*, first GND connector 34*a*, and first GND harness 36*a*. Furthermore, a very small current flows from the positive electrode of first power supply 17*a* to the negative electrode of first power supply 17*a* through first power supply harness 35*a*, first power connector 33*a*, power supply line 37*a*, diode Da, power supply circuit 44*a*, the common ground, resistor R1*a*, GND line 40*a*, first GND connector 34*a*, and first GND harness 36*a*.

On the other hand, a large current flows from the positive electrode of second power supply 17*b* to the negative electrode of second power supply 17*b* through second power supply harness 35*b*, second power connector 33*b*, power supply line 37*b*, power supply relay 38*b*, second inverter 31*b*, second shunt resistor 39*b*, GND line 40*b*, second GND connector 34*b*, and second GND harness 36*b*. Furthermore, a very small current flows from the positive electrode of second power supply 17*b* to the negative electrode of second power supply 17*b* through second power supply harness 35*b*, second power connector 33*b*, power supply line 37*b*, diode Db, power supply circuit 44*b*, the common ground, resistor R1*b*, GND line 40*b*, second GND connector 34*b*, and second GND harness 36*b*.

Figure 5:
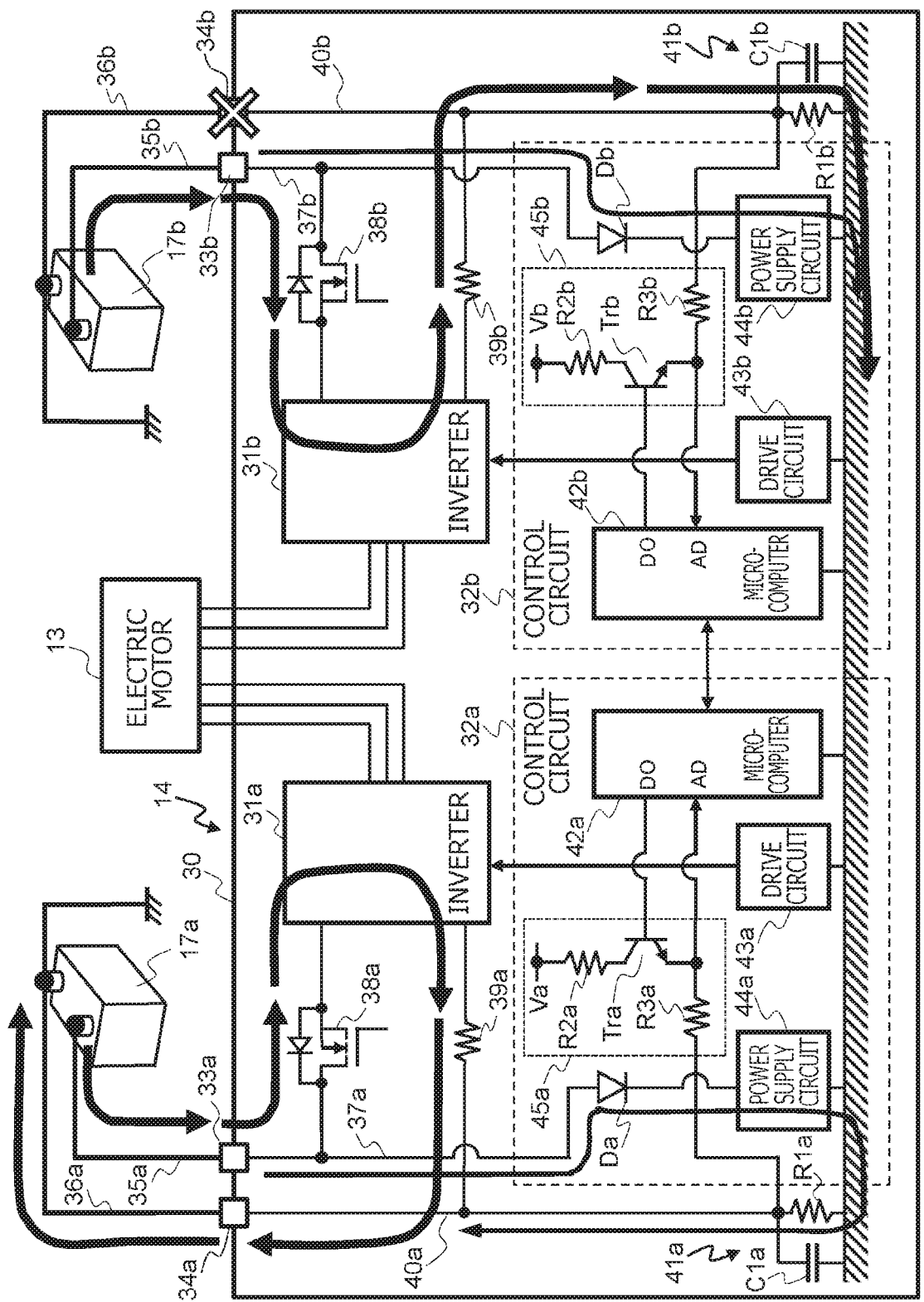
FIG. 5 is a circuit diagram showing flows of current from the first and second power supplies while a GND connector opens, in the electronic control unit shown in FIG. 2.

Here, it is assumed that second GND harness 36*b* is disengaged from second GND connector 34*b*, and this put second GND connector 34*b* in an open state, as indicated by an X mark in FIG. 5. In this case, a current that has flowed from the positive electrode of second power supply 17*b* through second power supply harness 35*b*, second power connector 33*b*, power supply line 37*b*, power supply relay 38*b*, second inverter 31*b*, second shunt resistor 39*b*, then flows to the negative electrode of first power supply 17*a* through GND line 40*b*, resistor R1*b*, the common ground, resistor R1a, GND line 40a, first GND connector 34a, and first GND harness 36a. Furthermore, a very small current flows from the positive electrode of first power supply 17a to the negative electrode of first power supply 17a through first power supply harness 35a, first power connector 33a, power supply line 37a, diode Da, power supply circuit 44a, the common ground, resistor R1a, GND line 40a, first GND connector 34a, and first GND harness 36a.

On the other hand, looking at first power supply 17a, a large current flows from the positive electrode thereof to the negative electrode of first power supply 17a through first power supply harness 35a, first power connector 33a, power supply line 37a, power supply relay 38a, first inverter 31a, first shunt resistor 39a, GND line 40a, first GND connector 34a, and first GND harness 36a, as in the normal state. Furthermore, a very small current flows from the positive electrode of first power supply 17a to the negative electrode of first power supply 17a through first power supply harness 35a, first power connector 33a, power supply line 37a, diode Da, power supply circuit 44a, the common ground, resistor R1a, GND line 40a, first GND connector 34a, and first GND harness 36a.

Thus, when second GND harness 36b is disengaged and second GND connector 34b is put in the open state, the direction of the current flowing through resistor R1b is reversed from that in the normal state. Similarly, when first GND harness 36a is disengaged and first GND connector 34a is put in the open state, the direction of the current flowing through resistor R1a is reversed from that in the normal state. Therefore, it is possible for microcomputer 42a to determine that first GND connector 34a is in the open state when the energization direction of first current-voltage conversion element 41a is reversed, and it is also possible for microcomputer 42b to determine that second GND connector 34b is in the open state when the energization direction of second current-voltage conversion element 41b is reversed.

Then, when microcomputer 42a determines that first GND connector 34a is in the open state, microcomputer 42a reduces or shuts off a current supplied to first coil set 13a of electric motor 13 by first inverter 31a. Furthermore, when microcomputer 42b determines that second GND connector 34b is in the open state, microcomputer 42b reduces or shuts off a current supplied to second coil set 13b of electric motor 13 by second inverter 31b.

Here, since first and second current-voltage conversion elements 41a, 41b cannot measure a negative current, and thus, first and second microcomputers 42a, 42b measure 0 V, it is possible to determine reversal of the energization direction by determining whether a voltage is a predetermined positive voltage or 0 V.

The determination of the abnormal state is not limited to be based on the direction of a current flowing through first and second current-voltage conversion elements 41a, 41b, but may be performed by various methods. For example, first microcomputer 42a may determine that first GND connector 34a in the same system is in the abnormal state when a current value obtained based on a voltage determined by first current-voltage conversion element 41a exceeds a predetermined value, or exceeds a predetermined range, and second microcomputer 42b may determine that second GND connector 34b in the same system is in the abnormal state when a current value obtained based on a voltage determined by second current-voltage conversion element 41b exceeds a predetermined value, or exceeds a predetermined range. Alternatively, first microcomputer 42a may determine that first GND connector 34a in the same system is in the abnormal state based on a current value obtained when the frequency that a voltage determined by first current-voltage conversion element 41a exceeds a predetermined value, or the frequency that the voltage is out of a predetermined range, is high, and second microcomputer 42b may determine that second GND connector 34b in the same system is in the abnormal state based on a current value obtained when the frequency that a voltage determined by second current-voltage conversion element 41b exceeds a predetermined value, or the frequency that the voltage is out of a predetermined range, is high. For the determination, the duration time may be measured or a count value of a counter may be used, and the connector rating should be considered, to prevent a burn or damage from occurring before performing the abnormality determination.

When it is determined that first or second GND connector 34a, 34b is in the open state, a current supplied from first or second inverter 31a, 31b determined to be in the open state, to first or second coil set 13a, 13b of electric motor 13 is shut off. If an inverter of the other system is not energized, the connector will not be operated beyond the rating even if energization of an inverter of the one system is continued.

Alternatively, when it is determined that first GND connector 34a is in the open state and second GND connector 34b is in the normal state, a current supplied from first inverter 31a to first coil set 13a of electric motor 13 may be reduced or shut off, whereas when it is determined that second GND connector 34b is in the open state and first GND connector 34a is in the normal state, a current supplied from second inverter 31b to second coil set 13b of electric motor 13 may be reduced or shut off.

Furthermore, first microcomputer 42a and second microcomputer 42b may perform inter-microcomputer communication, to reduce output currents of first and second inverters 31a, 31b such that a sum of a current supplied from first inverter 31a to the first coil set of electric motor 13 and a current supplied from second inverter 31b to the second coil set of electric motor 13 falls within the rated current. This makes it possible to change an abnormality determination threshold depending on the current of the one system and the current (or target current) of the other system. When only one system is energized, a voltage drop occurs only in the GND harness in that system, so that sneak of current into the other system will occur via current-voltage conversion element 41a, 41b. Therefore, it is possible to prevent erroneous diagnosis by changing the abnormality determination threshold.

Figure 6:
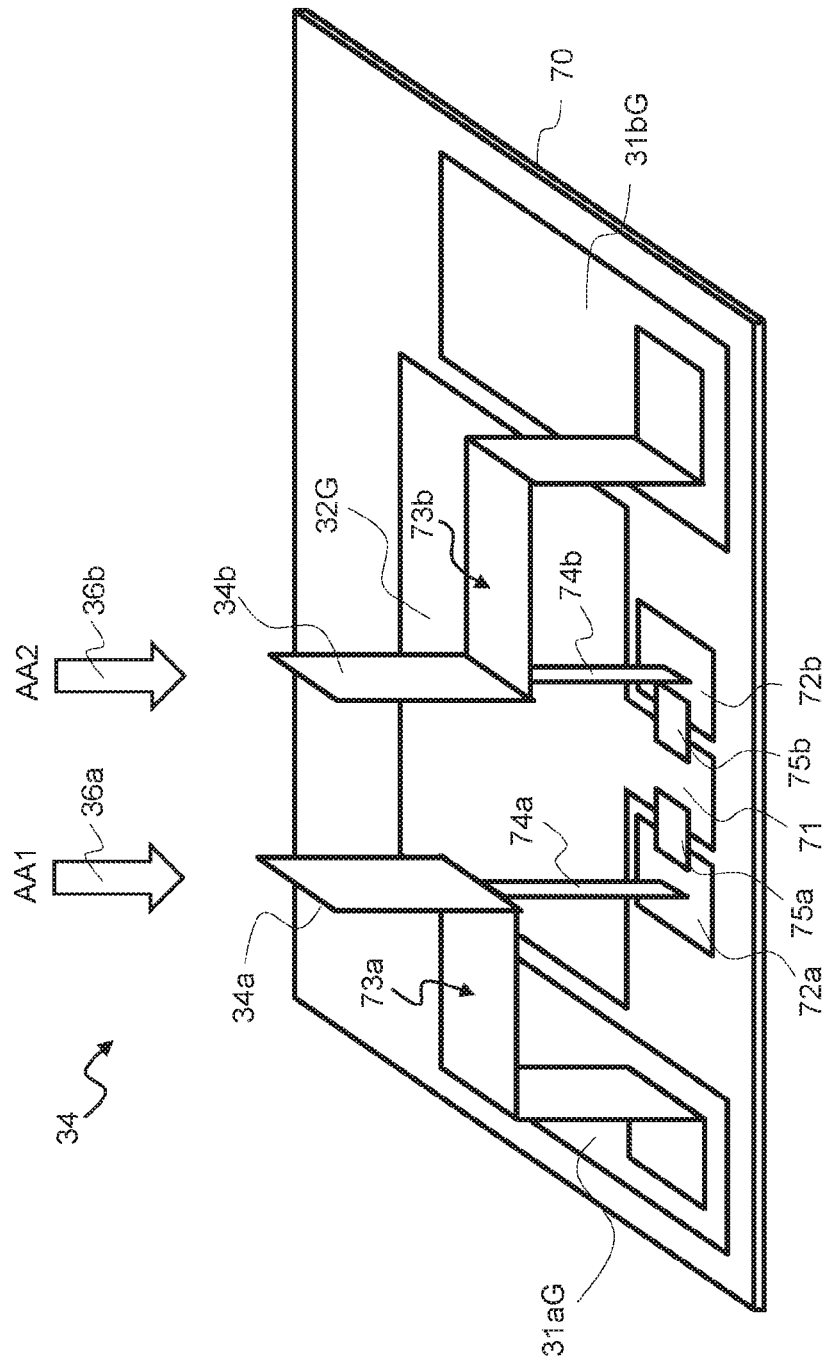
FIG. 6 is a perspective view showing an example of the configuration of a connector section in the electronic control unit shown in FIG. 2.

FIG. 6 shows an example of the configuration of a connector section of EPS control ECU 14 shown in FIG. 2. EPS control ECU 14 is mounted on a printed circuit board (PCB) 70. On an element mounting surface of printed circuit board 70, a common ground pattern layer 32G of first and second control circuits 32a, 32b is provided. On both sides across common ground pattern layer 32G, a ground pattern layer 31aG of first inverter 31a and a ground pattern layers 31bG of second inverter 31b are formed. Common ground pattern layer 32G is formed to have a projection (joining point) 71 at a position corresponding to GND connector section 34, and island-shaped pattern layers 72a, 72b are arranged on both sides across projection 71.

A resistance layer 75a (resistor R1a) that functions as first current-voltage conversion element 41a is formed so as to connect island-shaped pattern layer 72a and protrusion 71, and a resistance layer 75b (resistor R1b) that functions as second current-voltage conversion element 41b is formed so as to connect island-shaped pattern layer 72b and protrusion 71. Here, projection 71 is used as a wiring of a pattern wider than the width of resistance layer 75a and the width of resistance layer 75b.

Metal plates 73a, 73b are erected on the element mounting surface of printed circuit board 70, and are bent in a stepwise fashion, so that tip portions of metal places 73a, 73b function as GND connectors 34a, 34b. Base portions of metal plates 73a, 73b are electrically connected to ground pattern layers 31aG, 31bG, respectively, and intermediate portions are electrically connected to island-shaped pattern layers 72a, 72b through support members 74a, 74b, respectively. To the tip portions (first and second GND connectors 34a, 34b) of metal plates 73a, 73b, first and second GND harnesses 36a, 36b, each having a connector section with the shape corresponding to the corresponding one of first and second GND harnesses 36a, 36b, are inserted in the directions of arrows AA1, AA2, respectively.

As described above, the pattern between resistance layer 75a and resistance layer 75b (i.e., projection 71) is used as a wiring of a pattern wider than the width of resistance layer 75a and the width of resistance layer 75b. Thus, even when a failure occurs, it is possible to prevent a break that might occur when inverter currents from two systems supplied from both power supplies 17a, 17b flow in.

Common ground pattern layer 32G of first and second control circuits 32a, 32b is arranged downstream of joining point 71 of first and second GND lines 40a, 40b from first and second current-voltage conversion elements 41a, 41b. Thereby, even when a failure occurs, it is possible to prevent the ground current of inverters 31a, 31b from being supplied into the grounds of control circuits 32a, 32b.

Figure 7:
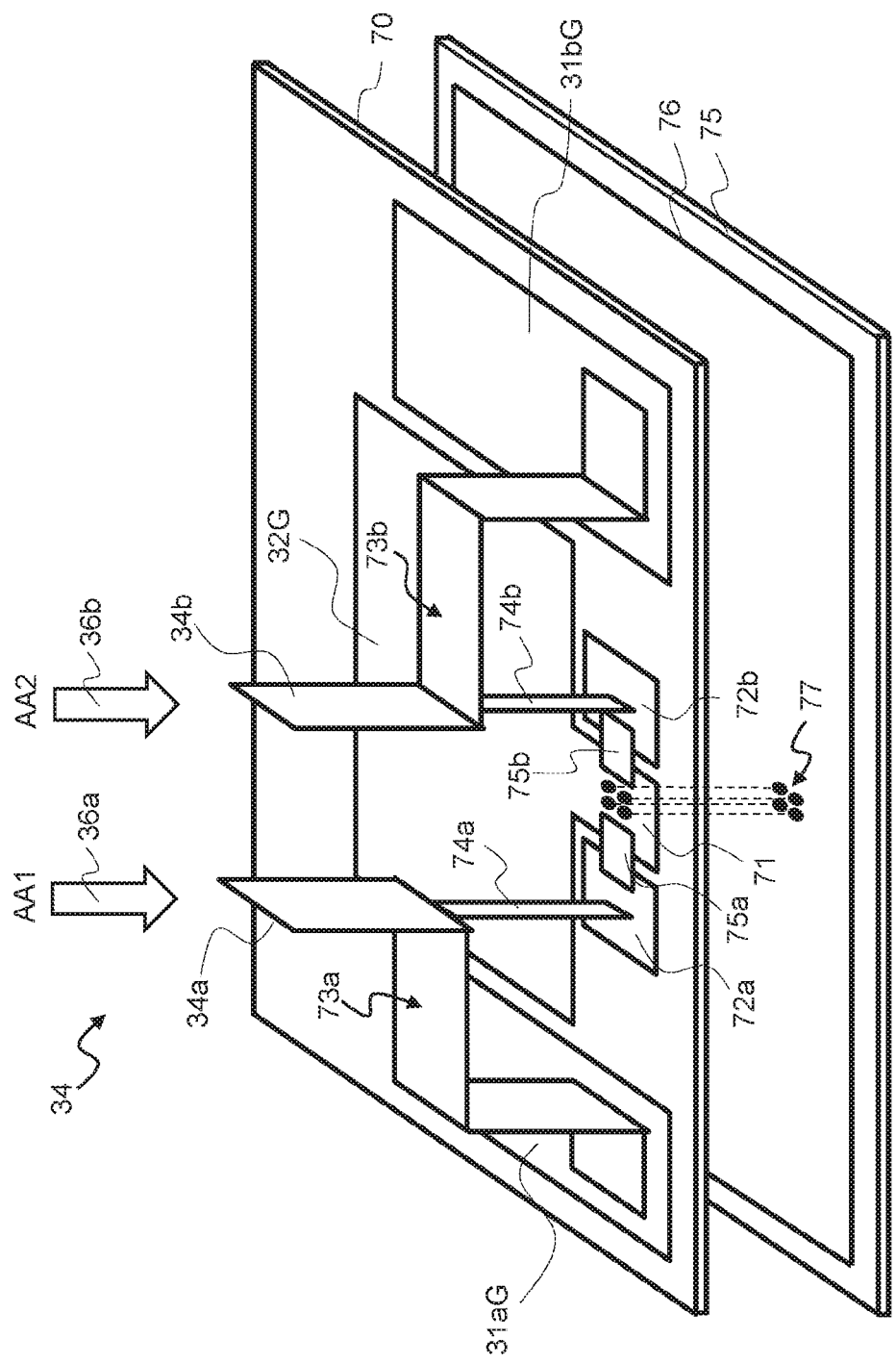
FIG. 7 is a perspective view showing another example of the configuration of the connector section in the electronic control unit shown in FIG. 2.

FIG. 7 shows another example of the configuration of the connector section of EPS control ECU 14 shown in FIG. 2. In this example, on the back of printed circuit board 70, a ground plane (GND plane) layer 76 that functions as a common ground of first and second control circuits 32a, 32b is laminated. Alternatively, a ground plane layer 76 may be formed on the back of printed circuit board 70.

Then, common ground pattern layer 32G and ground plane layer 76 are electrically connected through multiple through holes 77 formed at the pattern (projection 71) between resistance layer 75a and resistance layer 75b of printed circuit board 70. In this way, ground plane layer 76 is connected through through holes 77 formed through printed circuit board 70. Through holes 77 are arranged at an area having a distance shorter than the length of resistance layers 75a, 75b, with respect to resistance layers 75a, 75b.

With such a configuration, it is possible to decrease the impedance between first and second current-voltage conversion elements 41a, 41b and the ground of first and second control circuits 32a, 32b.

As described above, according to the present invention, since the first or second control circuit determines whether the first or second GND connector is in an abnormal state based on the energization direction of the first or second current-voltage conversion element, it is possible to continue the drive control of the electric motor by the normal system even when a GND connector or a GND harness has failed or is abnormal.

Therefore, it is possible to provide an electronic control unit, and a diagnostic method for the electronic control unit, having a system in which the power supply system, the drive system, and the control system are made redundant, and a common ground of the control system is provided, and being capable of continuing drive control of an electric motor by a normal system even when a ground connector or a ground harness is in an abnormal state.

In the embodiment, described above, a case in which the EPS control ECU is used as the electronic control unit has been described as an example. However, the electronic control unit is not limited to the EPS control ECU, and may be applicable to various devices and systems.

Furthermore, although a case in which the resistors are used as the first and second current-voltage conversion elements has been described as an example, it is not limited to the resistors, and it is only required to measure a current or a voltage between the first and second GND connectors and the ground of the first and second control circuits. For example, similar effects may be achieved by using the resistance of a conductive member without providing the resistors of the first and second current-voltage conversion elements. Furthermore, a current measuring element or a voltage measuring element may be used instead of the current-voltage conversion elements.

Furthermore, although one resistor is used for each of the first and second current-voltage conversion elements, multiple resistors connected in series may be used. In this case, even if one of the resistors has a short-circuit fault, it is possible to determine an abnormality or a failure by the other resistors.

Furthermore, although the first and second current-voltage conversion elements measure a current by first converting the current into a voltage, a current value may be directly obtained.

Furthermore, although a case in which the currents are directly measured by current measuring circuits 45a, 45b has been described as an example, an amplifier circuit or a buffer circuit may be provided for amplification if an accurate current value is needed.

Furthermore, although first power supply 17a supplies electric power to first power connector 33a and first GND connector 34a through first power supply harness 35a and first GND harness 36a, respectively, and second power supply 17b supplies electric power to power connector 33b and second GND connector 34b through second power supply harness 35b and second GND harness 34b, respectively, the present invention is similarly applicable to a configuration in which a single power supply supplies electric power to first and second power connectors 33a, 33b and first and second GND connectors 34a, 34b, through first and second power supply harnesses 35a, 35b and first and second GND harnesses 36a, 36b.

Here, the technical concept that may be grasped from the embodiment described above will be described below with its effects.

According to one aspect, an electronic control unit includes:

a first power connector 33a and a first ground connector 34a;

a second power connector 33b and a second ground connector 34b;

a first inverter 31a connected to first power connector 33a and first ground connector 34a, first inverter 31a energizing a first coil set 13a of an electric motor 13 to drive first coil set 13a;

a second inverter 31b connected to second power connector 33b and second ground connector 34b, second inverter 31b energizing a second coil set 13b of electric motor 13 to drive second coil set 13b;

first and second control circuits 32a, 32b driven by first and second internal power supply voltages generated from an external power supply voltage applied to first power connector 33a and first ground connector 34a, and second power connector 33b and second ground connector 34b, to control first and second inverters 3a, 31b, respectively;

a first current-voltage conversion element 41a for determining whether first ground connector 34a is in an abnormal state, first current-voltage conversion element 41a being provided between a ground of first inverter 31a and a common ground of first and second control circuits 32a, 32b; and a second current-voltage conversion element 41b for determining whether second ground connector 34b is in an abnormal state, second current-voltage conversion element 41b being provided between a ground of second inverter 31b and the common ground of first and second control circuits 32a, 32b.

In another preferred aspect, an output voltage of the first current-voltage conversion element is input to the first control circuit, and the first control circuit determines whether the first ground connector is in an abnormal state, and an output voltage of the second current-voltage conversion element is input to the second control circuit, and the second control circuit determines whether the second ground connector is in an abnormal state.

According to another aspect, an electronic control unit includes:

a first power connector 33a and a first ground connector 34a that are connected to a first power supply 17a;

a second power connector 33b and a second ground connector 34b that are connected to a second power supply 17b;

a first inverter 31a connected to first power connector 33a and first ground connector 34a, first inverter 31a energizing a first coil set 13a of an electric motor 13 to drive first coil set 13a;

a second inverter 31b connected to second power connector 33b and second ground connector 34b, second inverter 31b energizing a second coil set 13b of electric motor 13 to drive second coil set 13b;

first and second control circuits 32a, 32b driven by first and second internal power supply voltages Va, Vb generated by first and second power supplies 17a, 17b, to control first and second inverters 31a, 31b, respectively;

a first current-voltage conversion element 41a provided between a ground of first inverter 31a and a common ground of first and second control circuits 32a, 32b; and a second current-voltage conversion element 41b provided between a ground of second inverter 31b and the common ground of first and second control circuits 32a, 32b, wherein first and second control circuits 32a, 32b determine whether first and second ground connectors 34a, 34b are in abnormal states based on an amount of current flowing through first and second current-voltage conversion elements 41a, 41b.

According to this configuration, since first or second control circuit 32a, 32b determines whether first or second ground connectors 34a, 34b is in an abnormal state based on a current flowing through first or second current-voltage conversion element 41a, 41b, it is possible to continue drive control of electric motor 13 by the normal system even when a ground connector 34a, 34b or a ground harness 36a, 36b has failed or is abnormal.

According to a preferred aspect, the electronic control unit further includes:

a first ground line 40a that commonly connects first ground connector 34a, the ground of first inverter 31a, the common ground of first control circuit 32a, and first current-voltage conversion element 41a; and a second ground line 40b that commonly connects second ground connector 34b, the ground of second inverter 31b, the common ground of second control circuit 32b, and second current-voltage conversion element 41b, wherein first control circuit 32a determines that first ground connector 34a is in an open state when first current-voltage conversion element 41a has a reversed energization direction, wherein second control circuit 32b determines that second ground connector 34b is in an open state when second current-voltage conversion element 41b has a reversed energization direction.

According to another preferred aspect, the electronic control unit further includes:

a first transmission line that transmits an output voltage of first current-voltage conversion element 41a to first control circuit 32a; and a second transmission line that transmits an output voltage of second current-voltage conversion element 41b to second control circuit 32b, wherein first control circuit 32a includes a first potential setting unit that changes an electric potential of the first transmission line, and second control circuit 32b includes a second potential setting unit that changes an electric potential of the second transmission line.

According to another preferred aspect, first control circuit 32a reduces or shuts off a current supplied from first inverter 31a to first coil set 13a of electric motor 13 when first control circuit 32a determines that first ground connector 34a is in an open state, and second control circuit 32b reduces or shuts off a current supplied from second inverter 31b to second coil set 13b of electric motor 13 when second control circuit 32b determines that second ground connector 34b is in an open state.

According to another preferred aspect, first control circuit 32a includes a first microcomputer 42a, and a first drive circuit 43a controlled by first microcomputer 42a to supply a pulse width modulation (PWM) signal to first coil set 13a of electric motor 13, second control circuit 32b includes a second microcomputer 42b, and a second drive circuit 43b controlled by second microcomputer 42b to supply a PWM signal to second coil set 13b of electric motor 13, and first and second microcomputers 42a, 42b communicate with each other to perform drive control of electric motor 13 and abnormality diagnosis.

According to another preferred aspect, first control circuit 32a further includes a first power supply circuit 44a that generates a first internal power supply voltage from a voltage of first power supply 17a, and supplies the first internal power supply voltage to first microcomputer 42a and first drive circuit 43a, and second control circuit 32b further includes a second power supply circuit 43b that generates a second internal power supply voltage from a voltage of second power supply 17b, and supplies the second internal power supply voltage to second microcomputer 42b and second drive circuit 43b.

According to another preferred aspect, first and second current-voltage conversion elements 41a, 41b convert a measured current into a voltage, and supply the voltage to first and second control circuits 32a, 32b, respectively.

According to another preferred aspect, first current-voltage conversion element 41a is a first resistor R1a, and second current-voltage conversion element 41b is a second resistor R1b. A voltage at each of the opposite ends of first resistor R1a is supplied to first control circuit 32a, and a voltage at each of the opposite ends of second resistor R1b is supplied to second control circuit 32b.

According to another preferred aspect, the electronic control unit further includes:

a first capacitor C1a connected in parallel with first current-voltage conversion element 41a; and a second capacitor C1b connected in parallel with second current-voltage conversion element 41b.

According to this configuration, it is possible to prevent the occurrence of a transient potential difference between the grounds of first and second inverters 31a, 31b, and the grounds of first and second control circuits 32a, 32b.

According to another preferred aspect, the electronic control unit further includes:

a first shunt resistor 39a for measuring a current supplied to first inverter 31a; and a second shunt resistor 39b for measuring a current supplied to second inverter 31b.

According to another preferred aspect, the electronic control unit further includes:

a first shunt resistor 39a provided between first inverter 31a and first ground connector 34a, first shunt resistor 39a measuring a phase current flowing through first coil set 13a of electric motor 13; and a second shunt resistor 39b provided between second inverter 31b and second ground connector 34b, second shunt resistor 39b measuring a phase current flowing through second coil set 13b of electric motor 13, wherein first current-voltage conversion element 41a has one end connected to first shunt resistor 39a on first ground connector 34a side, and the other end connected to the common ground, wherein second current-voltage conversion element 41b has one end connected to second shunt resistor 39b on second ground connector 34b side, and the other end connected to the common ground.

According to another preferred aspect, first and second current-voltage conversion elements 41a, 41b are mounted on a board 70 on which first and second control circuits 32a, 32b are mounted, and first current-voltage conversion element 41a and second current-voltage conversion element 41b are connected by a wiring (projection 71) having a pattern wider than a width of first and second current-voltage conversion elements 41a, 41b.

According to this configuration, even when a failure occurs, it is possible to prevent a break that might occur when a ground current flows from first or second inverter 31a, 31b.

According to another preferred aspect, the common ground of first and second control circuits 32a, 32b is arranged downstream of a joining point 71 of first and second ground lines 40a, 40b from first and second current-voltage conversion elements 41a, 41b.

According to this configuration, it is possible to prevent the ground current flowing from first or second inverter 31a, 31b, from flowing into the ground of first or second inverter control circuits 32a, 32b when a failure occurs, and thus, it is also possible to reduce effect on first or second control circuit 32a, 32b.

According to another preferred aspect, the electronic control unit includes:

a first printed circuit board 70 on which first and second current-voltage conversion elements 41a, 41b are mounted on an element mounting surface; and a second printed circuit board laminated on a back of the first printed circuit board 70, and having a joining portion on which a ground plane layer 76 is formed, wherein the ground plane layer is connected to one end of first current-voltage conversion element 41a and one end of second current-voltage conversion element 41b through a through hole 77 formed through the first printed board, wherein through hole 77 is arranged at an area having a distance shorter than a length of first and second current-voltage conversion elements 41a, 41b, with respect to first and second current-voltage conversion elements 41a, 41b.

According to this configuration, it is possible to reduce the impedance between first current-voltage conversion element 41a and the ground of first control circuit 32a, and the impedance between second current-voltage conversion element 41b and the ground of second control circuit 32b.

According to one aspect, a diagnostic method for an electronic control unit for diagnosing first and second ground connectors 34a, 34b, the electronic control unit including:

a first power connector 33a and a first ground connector 34a;

a second power connector 33b and a second ground connector 34b;

a first inverter 31a connected to first power connector 33a and first ground connector 34a, first inverter 31a energizing a first coil set 13a of an electric motor 13 to drive first coil set 13a;

a second inverter 31b connected to second power connector 33b and second ground connector 34b, second inverter 31b energizing a second coil set 13b of electric motor 13 to drive second coil set 13b;

first and second control circuits 32a, 32b driven by the first and second internal power supply voltages generated from an external power supply voltage applied to first power connector 33a and first ground connector 34a, and second power connector 33b and second ground connector 34b, to control first and second inverters 31a, 31b, respectively;

a first current-voltage conversion element 41a for determining whether first ground connector 34a is in an abnormal state, first current-voltage conversion element 41a being provided between a ground of first inverter 31a and a common ground of first and second control circuits 32a, 32b; and a second current-voltage conversion element 41b for determining whether second ground connector 34b is in an abnormal state, second current-voltage conversion element 41b being provided between a ground of second inverter 31b and the common ground of first and second control circuits 32a, 32b, the method includes the steps of:

inputting an output voltage of first current-voltage conversion element 41a to first control circuit 32a, and inputting an output voltage of second current-voltage conversion element 41b to second control circuit 32b; and determining whether first ground connector 34a is in an abnormal state by first control circuit 32a, and determining whether second ground connector 34b is in an abnormal state by second control circuit 32b.

According to this method, since first or second control circuit 32a, 32b determines whether first or second ground connector 34a, 34b is in an abnormal state based on a current flowing through first or second current-voltage conversion element 41a, 41b, it is possible to continue drive control of electric motor 13 by the normal system even when a ground connector 34a, 34b or a ground harness 36a, 36b has failed or is abnormal.

According to another preferred aspect, the diagnostic method further includes the step of determining, by first control circuit 32a or second control circuit 32b, that first ground connector 34a or second ground connector 34b is in an abnormal state, based on an energization direction of first current-voltage conversion element 41a, or an energization direction of second current-voltage conversion element 41b.

According to another preferred aspect, the step of determining whether first and second ground connectors 34a, 34b are in an abnormal state determines, by first control circuit 32a or second control circuit 32b, that first or second ground connector 34a, 34b is in an abnormal state when a current value measured by first or second current-voltage conversion element 41a, 41b exceeds a predetermined value.

According to another preferred aspect, the step of determining whether first and second ground connectors 34a, 34b are in an abnormal state determines, by first control circuit 32a or second control circuit 32b, that first or second ground connector 34a, 34b is in an abnormal state when a frequency that a current value measured by first or second current-voltage conversion element 41a, 41b exceeds a predetermined value is high.

According to this method, the current is limited in consideration of the ratings of first and second ground connectors 34a, 34b depending on the duration or the number of times the predetermined value is exceeded, so that it is possible to set it not to break before the abnormality determination.

According to another preferred aspect, the step of determining whether first and second ground connectors 34a, 34b are in an abnormal state determines, by first control circuit 32a or second control circuit 32b, that first or second ground connector 34a, 34b is in an open state when first or second control circuit 34a, 34b determines that first or second current-voltage conversion element 41a, 41b has a reversed energization direction.

According to another preferred aspect, the diagnostic method further includes the step of reducing or shutting off a current supplied from first inverter 31a or second inverter 31b, which is determined to be in an open state, to first coil set 13a or second coil set 13b of electric motor 13, when first ground connector 34a or second ground connector 34b is determined to be in the open state.

According to this method, it is possible to continue the assistance by reducing or shutting off the current supplied to first or second inverter 31a, 31b when the open determination function of first or second ground connector 34a, 34b is lost.

According to another preferred aspect, the diagnostic method further includes the steps of:

reducing or shutting off a current supplied from first inverter 31a to first coil set 13a of electric motor 13, when first ground connector 34a is determined to be in an open state and second ground connector 34b is determined to be in a normal state; and reducing or shutting off a current supplied from second inverter 31b to second coil set 13b of electric motor 13, when second ground connector 34b is determined to be in an open state and first ground connector 34a is determined to be in a normal state.

According to this method, it is possible to prevent the rating from being exceeded while an inverter in a normal state continues energizing, when one of ground connectors 34a, 34b is in an open state and no current is supplied from this inverter 31a, 31b.

According to another preferred aspect, the diagnostic method further includes the steps of:

performing communication between first and second control circuits 32a, 32b; and reducing an output current from first inverter 31a and an output current from second inverter 31b so that a sum of a current supplied from first inverter 31a to first coil set 13a of electric motor 13, and a current supplied from second inverter 31b to second coil set 13b of electric motor 13 falls within the rated current.

REFERENCE SYMBOL LIST

13 Electric motor
13a First coil set
13b Second coil set
14 EPS control ECU (electronic control unit)
17a First power supply
17b Second power supply
30 Housing
31a First inverter
31b Second inverter
32a First control circuit
32b Second control circuit
33a First power connector
33b Second power connector
34a First GND connector (first ground connector)
34b Second GND connector (second ground connector)
35a First power harness
35b Second power harness
36a First GND harness (first ground harness)
36b Second GND harness (second ground harness)
37a, 37b Power supply line
38a, 38b Power supply relay
39a First shunt resistor
39b Second shunt resistor
40a, 40b GND line
41a First current-voltage conversion element
41b Second current-voltage conversion element
42a First microcomputer
42b Second microcomputer
43a, 43b Drive circuit
44a, 44b Power supply circuit
45a, 45b Current measuring circuit
R1a, R1b Resistor
C1a, C1b Capacitor

The invention claimed is:

1. An electronic control unit comprising:
   a first power connector and a first ground connector;
   a second power connector and a second ground connector;
   a first inverter connected to the first power connector and the first ground connector, the first inverter energizing a first coil set of an electric motor to drive the first coil set;
   a second inverter connected to the second power connector and the second ground connector, the second inverter energizing a second coil set of the electric motor to drive the second coil set;
   a first control circuit connected to the first power connector and the first ground connector, the first control circuit generating a first internal power supply voltage to control the first inverter;
   a second control circuit connected to the second power connector and the second ground connector, the second control circuit generating a second internal power supply voltage to control the second inverter;
   a first current-voltage conversion element provided between a ground of the first inverter and a common ground of the first and second control circuits; and
   a second current-voltage conversion element provided between a ground of the second inverter and the common ground of the first and second control circuits.

2. The electronic control unit according to claim 1, wherein an output voltage of the first current-voltage conversion element is input to the first control circuit, and the first control circuit determines whether the first ground connector is in an abnormal state, and an output voltage of the second current-voltage conversion element is input to the second control circuit, and the second control circuit determines whether the second ground connector is in an abnormal state.

3. The electronic control unit according to claim 1, further comprising:

a first ground line that commonly connects the first ground connector, the ground of the first inverter, the common ground of the first control circuit, and the first current-voltage conversion element; and a second ground line that commonly connects the second ground connector, the ground of the second inverter, the common ground of the second control circuit, and the second current-voltage conversion element, wherein the first control circuit determines that the first ground connector is in an open state when the first current-voltage conversion element has a reversed energization direction, wherein the second control circuit determines that the second ground connector is in an open state when the second current-voltage conversion element has a reversed energization direction.

4. The electronic control unit according to claim 1, further comprising:

a first transmission line that transmits an output voltage of the first current-voltage conversion element to the first control circuit; and a second transmission line that transmits an output voltage of the second current-voltage conversion element to the second control circuit, wherein the first control circuit includes a first potential setting unit that changes an electric potential of the first transmission line, and the second control circuit includes a second potential setting unit that changes an electric potential of the second transmission line.

5. The electronic control unit according to claim 1, wherein the first control circuit reduces or shuts off a current supplied from the first inverter to the first coil set of the electric motor when the first control circuit determines that the first ground connector is in an open state, and the second control circuit reduces or shuts off a current supplied from the second inverter to the second coil set of the electric motor when the second control circuit determines that the second ground connector is in an open state.

6. The electronic control unit according to claim 1, wherein the first control circuit includes a first microcomputer, and a first drive circuit controlled by the first microcomputer to supply a pulse width modulation (PWM) signal to the first coil set of the electric motor, wherein the second control circuit includes a second microcomputer, and a second drive circuit controlled by the second microcomputer to supply a PWM signal to the second coil set of the electric motor, wherein the first and second microcomputers communicate with each other to perform drive control of the electric motor and abnormality diagnosis.

7. The electronic control unit according to claim 6, wherein the first control circuit further includes a first power supply circuit that generates a first internal power supply voltage from a voltage of the first power supply, and supplies the first internal power supply voltage to the first microcomputer and the first drive circuit, wherein the second control circuit further includes a second power supply circuit that generates a second internal power supply voltage from a voltage of the second power supply, and supplies the second internal power supply voltage to the second microcomputer and the second drive circuit.

8. The electronic control unit according to claim 1, wherein the first and second current-voltage conversion elements convert a measured current into a voltage, and supply the voltage to the first and second control circuits, respectively.

9. The electronic control unit according to claim 1, further comprising:

a first capacitor connected in parallel with the first current-voltage conversion element; and a second capacitor connected in parallel with the second current-voltage conversion element.

10. The electronic control unit according to claim 1, further comprising:

a first shunt resistor for measuring a current supplied to the first inverter; and a second shunt resistor for measuring a current supplied to the second inverter.

11. The electronic control unit according to claim 1, further comprising:

a first shunt resistor provided between the first inverter and the first ground connector, the first shunt resistor measuring a phase current flowing through the first coil set of the electric motor; and a second shunt resistor provided between the second inverter and the second ground connector, the second shunt resistor measuring a phase current flowing through the second coil set of the electric motor, wherein the first current-voltage conversion element has one end connected to the first shunt resistor on the first ground connector side, and the other end connected to the common ground, wherein the second current-voltage conversion element has one end connected to the second shunt resistor on the second ground connector side, and the other end connected to the common ground.

12. The electronic control unit according to claim 1, wherein the first and second current-voltage conversion elements are mounted on a board on which the first and second control circuits are mounted, wherein the first current-voltage conversion element and the second current-voltage conversion element are connected by a wiring having a pattern wider than a width of the first and second current-voltage conversion elements.

13. The electronic control unit according to claim 1, wherein the common ground of the first and second control circuits is arranged downstream of a joining point of the first and second current-voltage conversion elements and the first and second ground lines.

14. The electronic control unit according to claim 1, comprising:

a first printed circuit board on which the first and second current-voltage conversion elements are mounted on an element mounting surface; and a second printed circuit board laminated on a back of the first printed circuit board, and having a joining portion on which a ground plane layer is formed, wherein the ground plane layer is connected to one end of the first current-voltage conversion element and one end of the second current-voltage conversion element through a through hole formed through the first printed board, wherein the through hole is arranged at an area having a distance shorter than a length of the first and second current-voltage conversion elements, with respect to the first and second current-voltage conversion elements.

15. A diagnostic method for an electronic control unit for diagnosing first and second ground connectors, the electronic control unit including:

a first power connector and a first ground connector;

a second power connector and a second ground connector;

a first inverter connected to the first power connector and the first ground connector, the first inverter energizing a first coil set of an electric motor to drive the first coil set;

a second inverter connected to the second power connector and the second ground connector, the second inverter energizing a second coil set of the electric motor to drive the second coil set;

a first control circuit connected to the first power connector and the first ground connector, the first control circuit generating a first internal power supply voltage to control the first inverter;

a second control circuit connected to the second power connector and the second ground connector, the second control circuit generating a second internal power supply voltage to control the second inverter;

a first current-voltage conversion element provided between a ground of the first inverter and a common ground of the first and second control circuits; and a second current-voltage conversion element provided between a ground of the second inverter and the common ground of the first and second control circuits, the method comprising the steps of:

inputting an output voltage of the first current-voltage conversion element to the first control circuit, and inputting an output voltage of the second current-voltage conversion element to the second control circuit; and determining whether the first ground connector is in an abnormal state by the first control circuit, and determining whether the second ground connector is in an abnormal state by the second control circuit.

16. The diagnostic method for the electronic control unit, according to claim 15, further comprising the step of:

determining, by the first control circuit or the second control circuit, that the first ground connector or the second ground connector is in an abnormal state, based on an energization direction of the first current-voltage conversion element, or an energization direction of the second current-voltage conversion element.

17. The diagnostic method for the electronic control unit, according to claim 15, wherein determining whether the first and second ground connectors are in an abnormal state determines, by the first control circuit or the second control circuit, that the first or second ground connector is in an abnormal state when a current value measured by the first or second current-voltage conversion element exceeds a predetermined value.

18. The diagnostic method for the electronic control unit, according to claim 15, wherein determining whether the first and second ground connectors are in an abnormal state determines, by the first control circuit or the second control circuit, that the first or second ground connector is in an abnormal state when a frequency that a current value measured by the first or second current-voltage conversion element exceeds a predetermined value is high.

19. The diagnostic method for the electronic control unit, according to claim 15, further comprising the step of:

reducing or shutting off a current supplied from the first inverter or the second inverter, which is determined to be in an open state, to the first coil set or the second coil set of the electric motor, when the first ground connector or the second ground connector is determined to be in the open state.

20. The diagnostic method for the electronic control unit, according to claim 15, further comprising the steps of:

reducing or shutting off a current supplied from the first inverter to the first coil set of the electric motor, when the first ground connector is determined to be in an open state and the second ground connector is determined to be in a normal state; and reducing or shutting off a current supplied from the second inverter to the second coil set of the electric motor, when the second ground connector is determined to be in an open state and the first ground connector is determined to be in a normal state.

* * * * *